United States Patent Office 3,261,821
Patented July 19, 1966

3,261,821
PROCESS AND CATALYST FOR POLYMERIZATION OF 1-OLEFINS
Edwin J. Vandenberg, Wilmington, Del., assignor to Hercules Incorporated, a corporation of Delaware
No Drawing. Filed Dec. 31, 1959, Ser. No. 863,115
18 Claims. (Cl. 260—93.7)

This invention relates to an improved process for the polymerization of 1-olefins which selectively yields highly crystalline and/or stereoregular polymers with outstanding physical properties.

It is well known that 1-olefins may be polymerized by contacting it with a catalyst formed by admixing an alkylaluminum compound with a transition metal compound such as titanium tetrachloride. The product in the case of propylene is a mixture, generally of about equal parts of amorphous polymer and crystalline polymer. Because of the advantageous properties of the crystalline polypropylene, many attempts have been made to find a catalyst that will selectively produce the crystalline polymer with little or no amorphous polymer being formed.

Now in accordance with this invention it has been found that outstanding results in the polymerization of propylene and other 1-olefins may be obtained by using as the catalyst dialkylaluminum halides in combmination with the reaction mixture produced when titanium tetrachloride is reacted with an aluminum compound having the formula $AlR_3$ or $MAlR_4$ where R may be hydrogen or alkyl and M may be an alkali metal, in a molar ratio, such that there will be only about one R for every mole of titanium tetrachloride. It was most surprising to discover that the total reaction mixture of the titanium tetrachloride and $AlR_3$ or $MAlR_4$ could be used, without separating the insoluble catalyst component from the soluble by-products, in combination with a dialkylaluminum halide. Even more surprising was the fact that the use of the dialkylaluminum halide with this specific reaction mixture gives especially high yields of crystalline and/or stereoregular polymer. In addition, in many cases, the catalysts of this invention give very high rates of polymerization and/or much lower catalyst levels may be used.

The reaction mixture used as one of the catalyst components in the process of this invention is readily prepared by simply mixing the titanium tetrachloride with the aluminum compound. This is conveniently done at or near room temperature, but temperatures from about −50° C. to about 150° C. may be used. Preferably the organometallic compound is slowly added to the titanium chloride solution. While the reaction may be carried out in the absence of a diluent, it is preferably carried out in an inert, liquid organic diluent, as for example, a hydrocarbon such as hexane, cyclohexane, heptane, octane, benzene, toluene, xylene, mixtures of such hydrocarbons, as well as the commercial mixtures of aliphatic hydrocarbons, i.e. gasoline, kerosene, etc., halogenated hydrocarbons such as chlorobenzene, etc. After the reactants are mixed, the reaction mixture is heat-treated by heating it to a temperature of from about 50° C. to about 150° C., and preferably from about 70° C. to about 130° C. The length of time required for the heat-treatment will depend upon the temperature, the higher the temperature, the shorter the heating period required. Thus at a temperature of 150° C. a period of at least about 0.1 hr. is needed whereas at 50° C. a period of at least about 0.5 to 1.0 hr. is needed and preferably will be 1–16 hours. Longer heating periods may be used but are generally not necessary.

As pointed out above, the reaction mixture is prepared by reacting titanium tetrachloride with an aluminum compound having the formula $AlR_3$ or $MAlR_4$ where R is hydrogen or alkyl and M is an alkali metal. Exemplary of such aluminum compounds that may be used are aluminum trialkyls, aluminum alkyl hydrides, aluminum hydride and complexes of these compounds, such as the alkali metal aluminum tetraalkyls and alkali metal aluminum hydrides, as for example, triethylaluminum, tripropylaluminum, triisobutylaluminum, trioctylaluminum, diethylaluminum hydride, ethylaluminum dihydride, diisobutylaluminum hydride, aluminum hydride, lithium aluminum hydride, sodium aluminum hydride, lithium aluminum tetraethyl, sodium aluminum tetraethyl, etc.

In preparing the reaction mixture of the titanium tetrachloride and aluminum compound it is esesntial that the amount of aluminum compound reacted with the titanium tetrachloride be such that there is present in the reaction mixture an amount of the aluminum compound equivalent to about one alkyl or hydrogen radical for each mole of titanium tetrachloride. Slightly higher or slightly lower amounts of alkyl to titanium may be used but in general the amount of aluminum compound used should be such as will furnish from about 0.75 to about 1.5, and preferably from about 0.9 to about 1.1 alkyl or hydrogen radical per mole of titanium tetrachloride. Thus, for the reaction of an aluminum hydride, aluminum trialkyl or the alkylaluminum hydrides, the ratio of aluminum compound to titanium tetrachloride will be from about 0.25:1 to about 0.5:1 and preferably 0.33:1, and for the reaction of an alkali metal aluminum hydride or alkali metal aluminum tetraalkyl the ratio of aluminum compound to titanium tetrachloride will be from about 0.20 to about 0.37:1 and preferably 0.25:1.

The reaction mixture so prepared may be used in combination with any dialkylaluminum halide for the polymerization of 1-olefins in accordance with this invention. Exemplary of the dialkylaluminum halides that may be used are diethylaluminum chloride, diisobutylaluminum chloride, etc. The ratio of dialkylaluminum halide to the titanium used for the polymerization reaction may be varied from about 0.1:1 to about 20:1 and preferably will be from about 0.4:1 to about 5:1. The amount used will depend upon the purity of the monomer, diluent, etc.

Any 1-olefin may be polymerized with the catalyst combination of this invention. Exemplary of such 1-olefins are ethylene, propylene, 1-butene, 3-methyl-1-butene, 4-methyl-1-pentene, 5-methyl-1-hexene, vinyl cyclohexane, etc.

The polymerization of 1-olefins with the catalyst combination of this invention may be carried out in a wide variety of ways. The process may be carried out either as a batch or continuous operation and with or without the use of an inert, organic, liquid diluent. Generally, for ease of operation the polymerization is carried out in an inert, organic, liquid diluent. Exemplary of suitable diluents are aliphatic hydrocarbons, such as hexane, heptane, cycloaliphatic hydrocarbons, such as cyclohexane, aromatic hydrocarbons, such as benzene, toluene, xylene, or any mixture of such hydrocarbons, halogenated hydrocarbons, such as chlorobenzene, chloronaphthalene, etc.

The amount of the titanium containing reaction mixture used as one of the catalyst components in accordance with this invention will depend upon the monomer being polymerized, whether a batch or continuous process is used, etc. In general it will be an amount equivalent to from about 0.1 to about 1000 millimoles of titanium per mole of monomer and in the batch process may be from about 0.1 millimole per liter of reaction mixture to about 100 millimoles per liter, and in some types of continuous operation even higher concentrations might be used.

As is usual in the low-pressure polymerization of 1-olefins, the process is generally operated at close to ordinary temperatures and pressures. However, temperatures of from about −30° C. to about 120° C. may be used, and subatmospheric to superatmospheric pressures may be used. The manner in which the two catalyst components are added to the polymerization system is dependent upon the method by which the polymerization is carried out. They may be added all at once, in any order, or one or the other, or both may be added in increments or continuously during the polymerization. Many other variations in the process may be made as for example the addition of hydrogen to control the molecular weight, etc., without any deleterious effect on the yield, rate, etc.

The following examples will illustrate the polymerization of 1-olefins in accordance with this invention. The molecular weight of the polymer produced in these examples is shown by the reduced specific viscosity (RSV) given for each. By the term Reduced Specific Viscosity is meant the ηsp./C. determined on an 0.1% solution of the polymer in decahydronaphthalene containing 0.1 g. of the polymer per 100 ml. of solution at 135° C. unless otherwise indicated. Where the melting point of the polymer is given it is the temperature where birefringence due to crystallinity disappears. All parts and percentages are by weight unless otherwise indicated.

EXAMPLES 1–6

The air in a series of polymerization vessels was replaced with nitrogen, and into each was then charged about 33 parts of n-heptane and, after evacuating, 7–8 parts of propylene was added, after which the vessel and contents were equalized at the cited temperature. The aluminum compound used as the activator was then introduced as a solution in 0.6 part of n-heptane followed by an amount of the reaction mixture catalyst component equivalent to 10 millimoles of titanium per liter.

ture and then heating for 16 hours at 90° C. The aluminum hydride used in Example 4 was prepared as described in the literature (J. Am. Chem. Soc. 69, 1199 and 77, 3164) and on analysis was shown to contain 0.14 mole of diethyl ether per mole of aluminum hydride.

In the following table is set forth the aluminum compound reacted with the titanium tetrachloride, and the mole ratio of the aluminum compound to titanium tetrachloride, the amount of diethylaluminum chloride added to the polymerization mixture set forth as moles per liter, the reaction time, the initial and final pressures, the percent conversion to heptane-insoluble polymer and to heptane-soluble polymer and the RSV of each and the percent yield of heptane-insoluble polymer obtained.

At the end of the specified reaction time the polymerization was stopped by the addition of 4 parts of anhydrous ethanol. In Examples 1–5 an aliquot of the total reaction mixture was washed twice with 10% methanolic hydrogen chloride and then was washed neutral with water. The insoluble polymer was separated by filtration, washed three times with n-heptane, twice with absolute ethanol and then was dried for 16 hours at 80° C. under vacuum. The heptane-soluble polymer was isolated by combining the reaction mixture filtrate and heptane wash, concentrating these solutions by distillation and then precipitating the polymer by adding a large excess of anhydrous ethanol. The polymer so obtained was dried for 16 hours at 80° C. under vacuum.

In Example 6 the reaction mixture was diluted with n-heptane, washed twice with 10% methanolic hydrogen chloride and then with methanol until neutral. The insoluble polymer was separated by filtration, washed twice with n-heptane and dried for 4 hours at 80° C. under vacuum. The heptane-soluble polymer was isolated as in Examples 1–5.

*Table*

| Example | Al Compound Reacted with TiCl$_4$ | Molar Ratio Al/Ti | (C$_2$H$_5$)$_2$AlCl MMoles/l. | Pressure, p.s.i.g. | | Reaction Time | | Isolated Polymer | | | | |
|---|---|---|---|---|---|---|---|---|---|---|---|---|
| | | | | | | | | Heptane Insoluble | | | Heptane Soluble | |
| | | | | Initial | Final | Hrs. | Temp., ° C. | Percent Conv. | RSV | Percent Yield | Percent Conv. | RSV |
| 1 | Al(C$_2$H$_5$)$_3$ | ¹ 0.34:1 | 30 | 43 | −11 | 19 | 30 | 98 | 10.5 | 98.6 | 1.3 | 0.7 |
| 2 | Al(C$_2$H$_5$)$_3$ | ¹ 0.34:1 | 30 | 68 | −0.5 | 2.5 | 50 | 89 | 10.8 | 97 | 1.6 | 0.7 |
| 3 | (i-C$_4$H$_9$)$_2$AlH | 0.35:1 | 29 | 45 | 2 | 19 | 30 | 80 | 30 | 98 | 0.9 | 1.2 |
| 4 | AlH$_3$ | 0.34:1 | 29 | 44 | 9 | 97 | 30 | 57 | 38 | 86 | 5.5 | 1.3 |
| 5 | LiAl(C$_2$H$_5$)$_4$ | 0.27:1 | 29 | 45 | 20 | 19 | 30 | 48 | 17 | 94 | 0.6 | 1.5 |
| 6 | Al(C$_2$H$_5$)$_3$ | 0.5:1 | 15 | 47 | 3 | 27 | 30 | 78 | 37 | 98 | 1.8 | 2.2 |

¹ Analytical data indicated this ratio to be 0.31:1.

The reaction mixture used as one of the catalyst components in Examples 1 and 2 was prepared by adding a solution of 135 parts of triethylaluminum in 414 parts of n-heptane during a period of 65 minutes to a solution of 664 parts of titanium tetrachloride in 1528 parts of n-heptane under a nitrogen atmosphere and with the temperature at 18–26° C. (a molar ratio of Al:Ti of 0.34:1). The temperature of the mixture was then gradually raised over 1.5 hours to 91° C. and then to 98° C. over another 3 hours. At this point gas evolution had ceased and the mixture was refluxing. After 0.5 hour of additional heating at 98° C., it was cooled and stored at room temperature under nitrogen until used. Analysis showed it to contain on a molar ratio basis: Total Ti—1.00; Ti$^{+3}$—1.00; Al—0.314; Cl—3.92; ethyl—nil.

The reaction mixture used as one of the catalyst components in Examples 3 to 6 was prepared in each case by mixing an 0.125 molar solution of titanium tetrachloride in n-heptane with the given aluminum compound, aging the reaction mixture for 2 hours at room tempera-

EXAMPLE 7

The reaction mixture catalyst component in this example was prepared by adding a solution of triisobutylaluminum in n-heptane to a solution of titanium tetrachloride in n-heptane at 30° C. during 0.75 hr. The final ratio of Al to Ti was 0.33:1. The reaction mixture was held at 30° C. for 0.5 hr. and then was heat-treated by heating for 3 hours at 90–100° C.

A one-gal. autoclave was charged with 2 liters of a commercial mixture of aliphatic hydrocarbons having a boiling point of 190–230° C. After evacuating and repressuring with nitrogen 3 times, and the temperature adjusted to 50° C., an amount of a solution of diethylaluminum chloride in n-heptane equal to 20 millimoles per liter was added followed by an amount of the above catalyst reaction mixture equal to 10 millimoles per liter. After 30 minutes, the system was again evacuated and propylene was passed in at a pressure of about 15 p.s.i.g. The polymerization was run for 5 hours with the propylene input measured by a rotameter. The pressure was then released, 60 ml. of n-butanol was added, and the slurry was stirred for 0.5 hour. An aliquot was taken for analysis of insoluble and soluble polymer. To the reaction mixture was added 500 ml. of a 4% aqueous sodium hydroxide solution and stirring was continued for 0.5 hour. The aqueous layer was decanted, and the organic layer was water-washed and filtered. The filter cake was washed with heptane and then steam distilled, water-washed, and finally dried for 16 hours at 70° C. in a vacuum oven. There was obtained 11 g./l./hr. of total polypropylene, of which 99% was stereoregular (i.e. insoluble polymer). This heptane-insoluble polypropylene had an RSV of 14.8, a Rockwell hardness R of 78 and a torsional rigidity at 135° C. of 3,015 p.s.i.

EXAMPLE 8

The reaction mixture catalyst component in this example was prepared by adding over a period of 1.5 hours a solution of 15.2 millimoles of triethylaluminum in n-heptane to a solution of 45.5 millimoles of titanium tetrachloride in 56 parts of n-heptane at 0° C. The mixture was aged over night at 0° C. with agitation and then was heat-treated for 2 hours at 90° C. Analysis showed it to contain on a mole ratio basis: Total Ti—1.00; $Ti^{3+}$—0.95; Al—0.33; Cl—4.00.

4-methyl-1-pentene was polymerized by charging a polymerization vessel with 280 parts of anhydrous n-heptane, adjusting the temperature to 50° C. and then adding 8 millimoles of diethylaluminum chloride and an amount of the above reaction mixture equal to 4 millimoles of titanium and then finally adding 66 parts of 4-methyl-1-pentene. The polymerization was allowed to run for five hours and the polymerization was stopped by adding an amount of n-butanol equal to 4% of the total volume. After holding the polymerization reaction mixture at 50° C. for 0.5 hour, 4% aqueous caustic was added. The organic layer was then separated, and the solid polymer was isolated by filtration, washed with heptane and dried. The heptane-insoluble polymer so obtained amounted to a conversion of 94% and yield of 98%. It had an RSV of 11.4 and a melting point of 238° C.

EXAMPLE 9

1-butene was polymerized by the procedure described in Example 8, but substituting 60 parts of 1-butene for the 4-methyl-1-pentene used in that example. After 1.5 hours the polymerization slurry became too viscous to stir and the polymerization was stopped and the polymer isolated as before. The heptane-insoluble poly(1-butene) so obtained amounted to a yield of at least 84%. It had an RSV of 4.3 and a melting point of 127° C.

The foregoing examples demonstrate the exceptionally high yields and high rates of polymerization that may be obtained by the process of this invention and the improved physical properties of the polymers so produced.

What I claim and desire to protect by Letters Patent is:

1. The process of preparing a poly(olefin) which comprises polymerizing at least one 1-olefin of from 2 to 8 carbon atoms in an inert liquid diluent by contacting said olefin with at least a catalytic amount of a two-component catalyst composition comprising (1) the total reaction mixture produced prior to use in the polymerization process by the reaction in an inert liquid hydrocarbon diluent of titanium tetrachloride and an aluminum compound having the formula selected from the group consisting of $AlR_3$ and $MAlR_4$ where R may be one of the group consisting of H and alkyl and M is alkali metal in a molar ratio such that there is from about 0.75 to about 1.5R per titanium and heating the total reaction mixture to a temperature of from about 50° C. to about 150° C., and (2) a dialkylaluminum chloride wherein the alkyl groups contain 2 to 4 carbon atoms in an amount such that the molar ratio of the second catalyst component to the first catalyst component will be from about 0.1:1 to about 20:1.

2. The process of preparing a poly(olefin) which comprises polymerizing at least one 1-olefin of from 2 to 8 carbon atoms in an inert liquid diluent by contacting said olefin with at least a catalytic amount of a two-component catalyst composition comprising (1) the total reaction mixture produced prior to use in the polymerization process by the reaction in an inert liquid hydrocarbon diluent of titanium tetrachloride and an aluminum compound having the formula selected from the group consisting of $AlR_3$ and $MAlR_4$ where R may be one of the group consisting of H and alkyl and M is alkali metal in a molar ratio such that there is from about 0.9 to about 1.1R per titanium and heating the total reaction mixture to a temperature of from about 50° C. to about 150° C., and (2) a dialkylaluminum chloride wherein the alkyl groups contain 2 to 4 carbon atoms in an amount such that the molar ratio of the second catalyst component to the first catalyst component will be from about 0.1:1 to about 20:1.

3. The process of claim 2 wherein the dialkylaluminum chloride used as the second catalyst component is diethylaluminum chloride.

4. The process of claim 3 wherein the aluminum compound used to prepare the first catalyst component is an aluminum trialkyl.

5. The process of claim 3 wherein the aluminum compound used to prepare the first catalyst component is an alkali metal aluminum tetraalkyl.

6. The process of claim 3 wherein the aluminum compound used to prepared the first catalyst component is a dialkylaluminum hydride.

7. The process of claim 3 wherein the aluminum compound used to prepare the first catalyst component is an aluminum hydride.

8. The process of claim 4 wherein the 1-olefin is propylene.

9. The process of claim 4 wherein the 1-olefin is 4-methyl-1-pentene.

10. The process of claim 5 wherein the 1-olefin is propylene.

11. The process of claim 6 wrein the 1-olefin is propylene.

12. The process of claim 7 wherein the 1-olefin is propylene.

13. The process of claim 8 wherein the aluminum trialkyl is triethylaluminum.

14. The process of claim 9 wherein the aluminum trialkyl is triethylaluminum.

15. The process of claim 10 wherein the alkali metal aluminum tetraalkyl is lithium aluminum tetraethyl.

16. The process of claim 11 wherein the dialkylaluminum hydride is diisobutylaluminum hydride.

17. A catalyst composition prepared by the sequence of steps comprising (1) reacting hydrocarbon solutions of aluminum triethyl and titanium tetrachloride in a mole ratio ranging from about .25:1 to less than .4:1 at elevated temperatures until at least the aluminum triethyl is completely oxidized and (2) thereafter reacting the total product of (1) with a hydrocarbon solution of aluminum diethyl chloride in an amount to give a total aluminum to titanium mole ratio of from 1:1 to 20:1.

18. A catalyst composition prepared by the sequence of steps comprising (1) reacting hydrocarbon solutions of aluminum triethyl and titanium tetrachloride in a mole ratio of about 0.33:1 at elevated temperatures until at least the aluminum triethyl is completely oxidized and (2) thereafter reacting the total product of (1) with a hydrocarbon solution of aluminum diethyl chloride in an amount to give a total aluminum to titanium mole ratio from 1:1 to 20:1.

(References on following page)

References Cited by the Examiner

UNITED STATES PATENTS

| | | | |
|---|---|---|---|
| 2,880,199 | 3/1959 | Jezl | 260—93.7 |
| 2,893,984 | 7/1959 | Seelbach et al. | 260—93.7 |
| 2,914,515 | 11/1959 | Stuart | 260—88.2 |
| 2,943,063 | 6/1960 | Eby et al. | 252—429 |
| 2,971,925 | 2/1961 | Winkler et al. | 252—429 |

FOREIGN PATENTS 789,781  1/1958  Great Britain.

OTHER REFERENCES

Gaylord: "Linear and Stereoregular Addition Polymers" (1959), Interscience Publishers Inc., New York (p. 92).

TOBIAS E. LEVOW, *Primary Examiner.*

MORRIS LIEBMAN, JOSEPH R. LIEBERMAN, JULIUS GREENWALD, *Examiners.*

J. G. LEVITT, S. ASTOR, R. D. LOVERING,
*Assistant Examiners.*